June 20, 1933.  G. S. AWES  1,915,114
FOLDING LUGGAGE CARRIER
Filed March 7, 1932   2 Sheets-Sheet 1
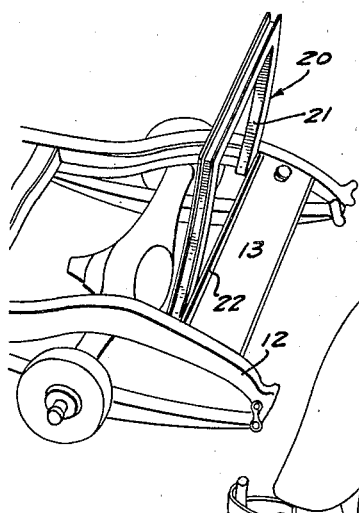
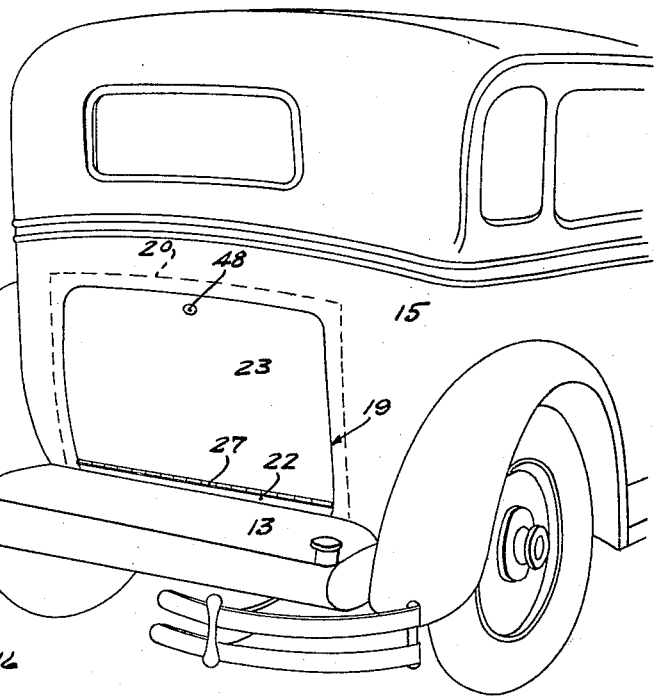
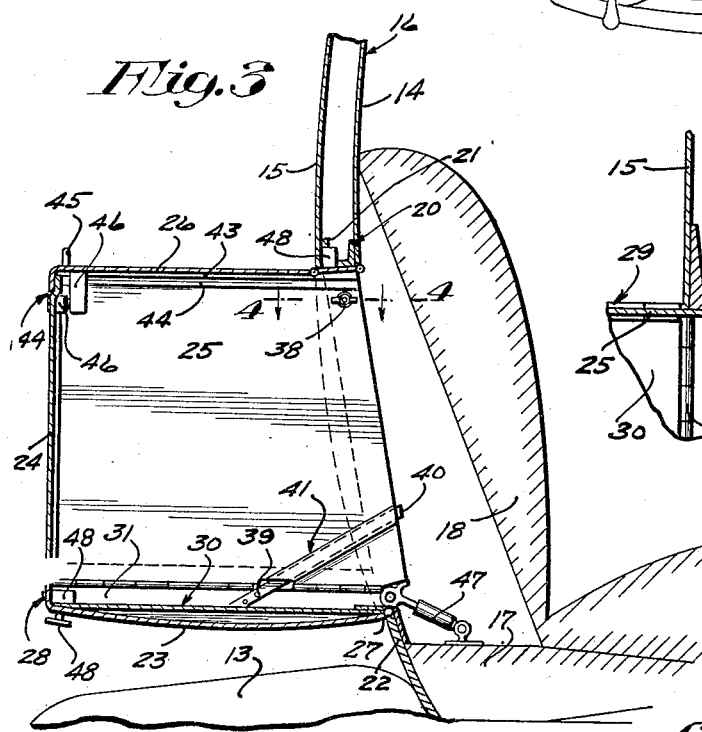
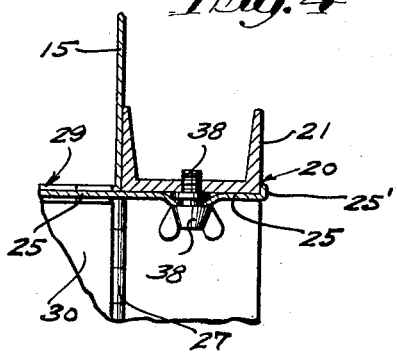
Inventor
George S. Awes
By his Attorneys
Merchant and Kieson June 20, 1933.     G. S. AWES     1,915,114
FOLDING LUGGAGE CARRIER
Filed March 7, 1932    2 Sheets-Sheet 2
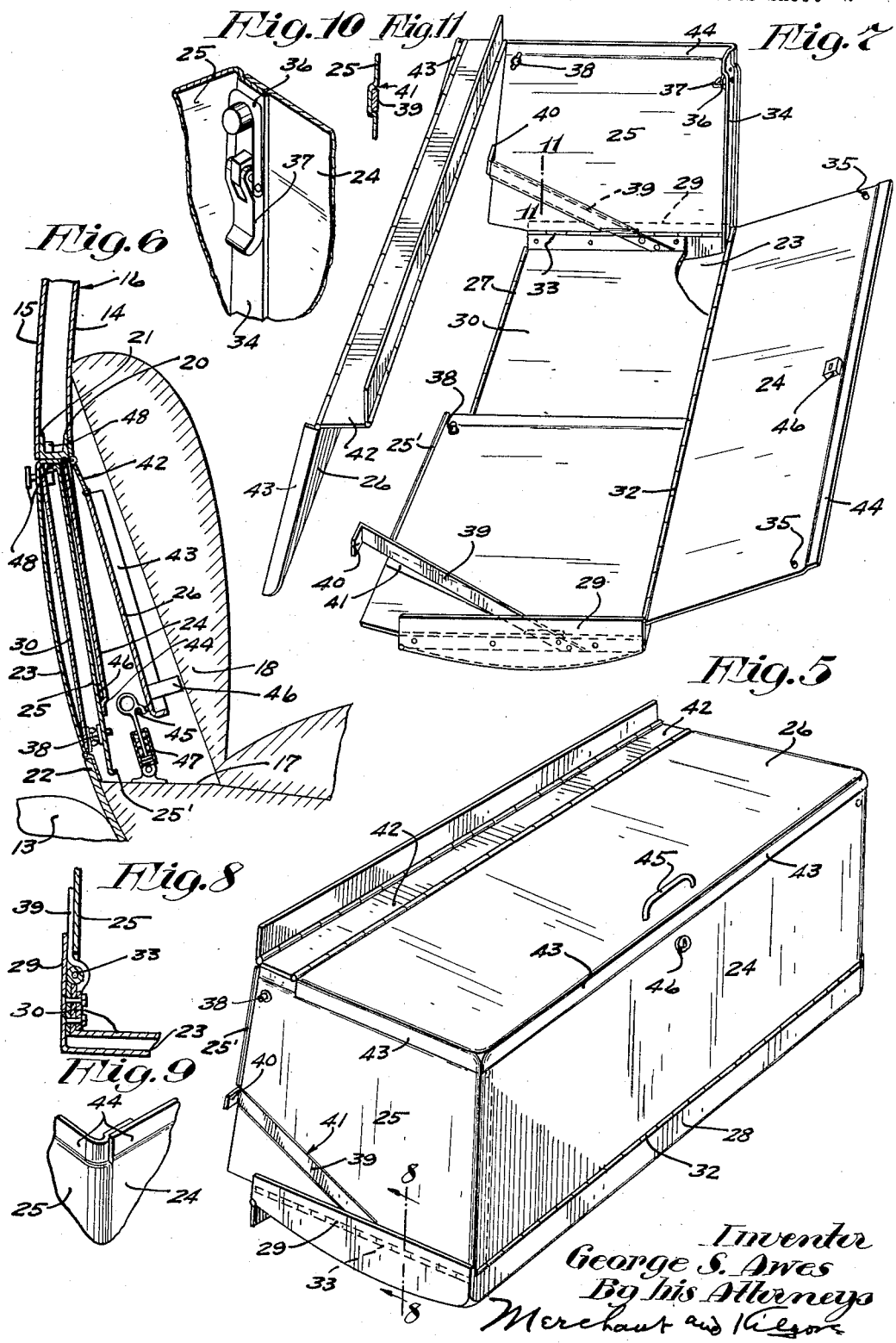
Inventor
George S. Awes
By his Attorneys
Merchant and Nelson Patented June 20, 1933

1,915,114

UNITED STATES PATENT OFFICE

GEORGE S. AWES, OF MINNEAPOLIS, MINNESOTA

FOLDING LUGGAGE CARRIER

Application filed March 7, 1932. Serial No. 597,129.

My invention relates to luggage carriers and more particularly to such a carrier for automotive vehicles. The object of the invention is the provision of a luggage carrier that is built into the body of an automotive vehicle having an aperture through which the carrier, when folded, may be moved and stored in the waste space, preferably, between the back of the body and the back of the adjacent seat, one of the members of the carrier being constructed and arranged to close the aperture in the body of the vehicle when the carrier is folded into said body and form a symmetrical section of the outer shell of the body.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the rear end portion of an automobile having the invention embodied therein;

Fig. 2 is a fragmentary perspective view of the chassis of the automobile and showing the frame which forms the aperture in the body for the carrier;

Fig. 3 is a fragmentary perspective view in longitudinal vertical section taken through the body of the vehicle and carrier and showing said carrier set up outward of the body ready for use;

Fig. 4 is a fragmentary detail view with some parts sectioned on the line 4—4 of Fig. 3, on an enlarged scale;

Fig. 5 is a perspective view of the carrier, as shown in Fig. 3, but removed from the automobile;

Fig. 6 is a view corresponding to Fig. 3 with the exception that the carrier is folded into the body of the automobile;

Fig. 7 is a perspective view showing the carrier removed from the automobile and partly folded;

Fig. 8 is a fragmentary detail view with some parts sectioned on the line 8—8 of Fig. 5, on an enlarged scale;

Fig. 9 is a fragmentary detail perspective view showing the upper left-hand corner portion of the body of the carrier;

Fig. 10 is a view corresponding to Fig. 9 but looking at the body from the inside and showing the respective separable fastener; and Fig. 11 is a fragmentary detail view in section taken on the line 11—11 of Fig. 5, on an enlarged scale.

Of the parts of the automobile shown it is important to note the frame 12, the gas tank 13, the inner and outer shells 14 and 15, respectively, of the body 16, the floor 17 and the rear seat 18. The back of the seat 18 is spaced from the back of the body 12 and forms a waste space therebetween in which the improved carrier is folded when not in use.

The invention provides an aperture 19 in the back of the body 16 surrounded by a frame 20 comprising an angle bar 21, in the form of a yoke, and a cross-tie bar 22 which connects the arm of said yoke at the lower ends thereof. This frame 20 is between the shells 14 and 15, is rigidly secured thereto and to the frame 12 just forward of the gasoline tank 13.

The improved carrier comprises a bottom plate 23, a back plate 24, a pair of side plates 25 and a cover plate 26. The bottom plate 23 is secured at its inner edge to the cross-tie bar 22 by a hinge 27 which permits the bottom plate 23 to swing downward into a horizontal position just over the gasoline tank 13. It is important to note that the bottom plate 23, when the carrier is folded into the body 16, forms a complete closure for the aperture 19, has the same contour as the shell 15 and forms a symmetrical section of the body 16. Marginal edge portions of the bottom plate 23 are bent laterally upward to form a back flange 28 and a pair of side flanges 29.

To prevent the bottom plate 23 from being dented, sprung or bent by articles placed or thrown into the carrier and that would mar the appearance of the body of the automobile when the carrier is folded therein, said bottom plate is provided with a flat false bottom plate 30. The bottom plate 23 is concavo-convex in section longitudinally of the vehicle and the flat false bottom 30 rests on the inner and outer longitudinal edge portions thereof within the flanges 28 and 29. This mounting of the false bottom 30 over the concave face of the bottom plate 23 holds the same laterally spaced therefrom so that bending, denting or otherwise distorting said false bottom will not mar the bottom plate 23.

Certain marginal edge portions of the false bottom plate 30 are bent laterally upward to form a pair of side flanges 31 that are rigidly secured to the side flanges 29 and are relatively low in respect thereto, see Fig. 8. The flanges 28, 29 and 31 reinforce the bottom plates 23 and 30 and thereby hold the same rigid so that they will not warp or bend under the load they are intended to carry.

The back plate 24 is secured by a hinge 32 to the upper edge of the flange 28 for swinging movement on either side of its operative position in which it is perpendicular to the false bottom 30.

The side plates 25 are secured by hinges 33 to the bottom plates 23 and 30, as shown in Fig. 8, for inward swinging movement upon the false bottom plate 30. It is important to note that the hinge 32 is just above the hinges 33 in order to permit the back plate 24 to be folded onto the folded side plates 25. The hinges 33 are materially below the upper edges of the flanges 29 and the upper portions of said flanges act as stops to limit the outward swinging movement of the side plates 25 and stop said plates in operative positions in which they are perpendicular to the false bottom plate 30. The outer vertical edge portions of the side plates 25 are bent laterally inward to form rabbetted reinforcing flanges 34 in which the vertical edge portions of the back plate 24 is seated.

A pair of separable fasteners are provided for detachably securing the back plate 24 to the side plates 25 and each thereof comprises a fixed stud 35 and a yoke 36. The studs 35 are fixed on the inner face of the back plate 24 and extending through holes in the flanges 34. The yokes 36 are carried by levers 37 pivoted to lugs on the inner faces of the respective flanges 34. These yokes 36 when in operative positions extend into circumferentially extended annular grooves in the studs 35 and their pivotal connections with the levers 37 are beyond dead centers so as to hold said levers in operative positions, see Figs. 7 and 10.

The side plates 25 when in operative positions extend through the aperture 19, bear against the side members of the frame 21 and are rigidly but detachably secured thereto by separable fasteners in the form of thumb screws 38 loosely swivelled to said side plates and have threaded engagement with the frame 21, see Fig. 4. The side plates 25 when secured to the frame 21 by the separable fasteners 38 support the bottom plate 23 in a horizontal position, as shown in Fig. 3.

To further support and hold the bottom plate 23 and take part of the load supporting strain from the side plates 25 and their hinges 33, said side plates 25 are provided with a pair of arms 39 rigidly secured at one of their ends to the side flanges 29 and 32. These arms 39 project inwardly and upwardly from the bottom plates 23 and 30 and have on their free ends outturned heads 40 which act as stops and engage the inner faces of the frame 21 as a base of resistance, see Figs. 3, 5 and 7. Said arms 39 are in the planes of the side plates 25 and said plates have in their outer faces channels 41 through which said arms extend longitudinally, see Figs. 3, 5, 7 and 11.

The side plates 25 have on their inner upright edges above the channels 41 outturned stop flanges 25' which engage the uprights of the frame and materially assist in supporting the carrier from the frame, see Figs. 4 and 7.

The cover plate 26 is secured to the frame 21, independent of the body of the carrier, by a double-fold hinge 42. This hinge 42 connects the cover plate 26 at its inner longitudinal edge to the shell 14 at the inner face thereof, see Fig. 3. When the carrier is set up one of the joints of the hinge 42 is substantially in the plane of the shell 14, the other joint of said hinge is substantially in the plane of the shell 15 and the intermediate portion of the hinge 42 is between said two joints, extending through the aperture 19, just under the top member of the frame 21, and is supported on the upper edges of the side plates 25. When the hinge 42 is positioned, as shown in Fig. 3, the cover plate 26 is free to be opened or closed and swing about the axis of the outer joint of said hinge. In folding the cover plate 26 into the body 16 the cover plate 26 swings downwardly and inwardly about the axis of the inner joint of the hinge 42. The cover plate 26 is provided with a capping flange 43 which, when said plate is closed, overlaps the side plates 25 and extends into a rabbet 44 in the top edge portion of the back plate 24, see Fig. 3.

A yoke-like handle 45 on the cover plate 26 affords convenient means by which said cover plate may be held when opening or closing the same and a key-equipped lock 46 is provided for securing the cover plate 26 closed. A spring catch 47 on the floor 17 is arranged to engage the handle 45 and hold the cover plate 26 in the body 16, as shown in Fig. 6.

To fold the carrier into the body 16 the cover plate 26 is held raised while the separable fasteners 35 are manipulated to release the back plate 24 from the side plates 25. The back plate 24 is then turned outward to release the same from the rabbetted flanges 34, as shown in Fig. 7, and the end plates 25 folded inward upon the bottom plate 30 which carries their channels 41 away from the arms 39 and thereafter said back plate 24 is folded onto the side plates 25. The cover plate 26 is next folded into the body 16, through the aperture 19, and secured by the latch 47, as shown in Fig. 6. Finally the folded body of the carrier is moved into the body 16, through the aperture 19, and secured by a latch 48. This latch 48 includes a hand piece on the bottom plate 23 and the cooperating member on the body 16 between the shells 14 and 15. During the movement of the folded carrier into the body 16 the arms 39 move therewith.

The above described carrier when folded into the body 16 is entirely out of the way and is inconspicuous.

From the foregoing it must be evident that the invention herein disclosed is capable of large range of modification within the spirit of the invention herein disclosed and claimed.

It is further evident from the drawings and description that the entire carrier is attached to the frame 20.

What I claim is:

1. The combination with the outer shell of the body of a vehicle having an aperture, of a folding luggage carrier comprising a bottom plate, a back plate, two side plates and a cover plate, said cover plate normally capping the back and side plates, said bottom plate being hinged to the body at the bottom of the aperture for outwardly and downwardly swinging movement from an upright position in which it affords a closure for the aperture, said back and side plates being hinged to the bottom plate for folding movement thereon, said cover plate being hinged to the body at the top of the aperture for downwardly and forwardly swinging movement through the aperture in advance of the movement of the bottom plate to a position in which it closes the aperture.

2. The structure defined in claim 1 in which the side plates when in an operative position extend into the aperture at the sides thereof, and which structure further includes fastening means for securing the side plates to the body when in an operative position.

3. The structure defined in claim 1 in which the side plates when in an operative position extend into the aperture at the sides thereof and have at their inner edged outturned stop flanges that engage the body inward of the aperture and hold the luggage carrier in an operative position, and which structure further includes fastening means for securing the side plates to the body.

4. The structure defined in claim 1 which further includes a pair of fixed oblique arms which extend through the aperture with their inner ends arranged to engage the body as stops to hold the luggage carrier in an operative position.

5. The structure defined in claim 1 which further includes a fastener for holding the cover plate when folded in the body.

6. The structure defined in claim 1 in which the hinge for the cover plate is of the double-fold type with one of its joints at the inside of the body and with its other joint at the outside of the body.

7. A folding luggage carrier comprising a rectangular frame applicable to a vehicle body, a bottom plate, a back plate, two side plates, and a cover plate, said cover plate normally capping the back plate and the side plates, said bottom plate being hinged to the frame at the bottom thereof for outwardly and downwardly swinging movement from an upright position in which it affords a closure for the opening through the frame, said back and side plates being hinged to the bottom plate for folding movement thereon, said cover plate being hinged to the frame at the top thereof for downwardly and forwardly swinging movement through the frame, said bottom plate when folded affords a closure for the opening through the frame.

In testimony whereof I affix my signature.

GEORGE S. AWES.